Patented Apr. 8, 1930

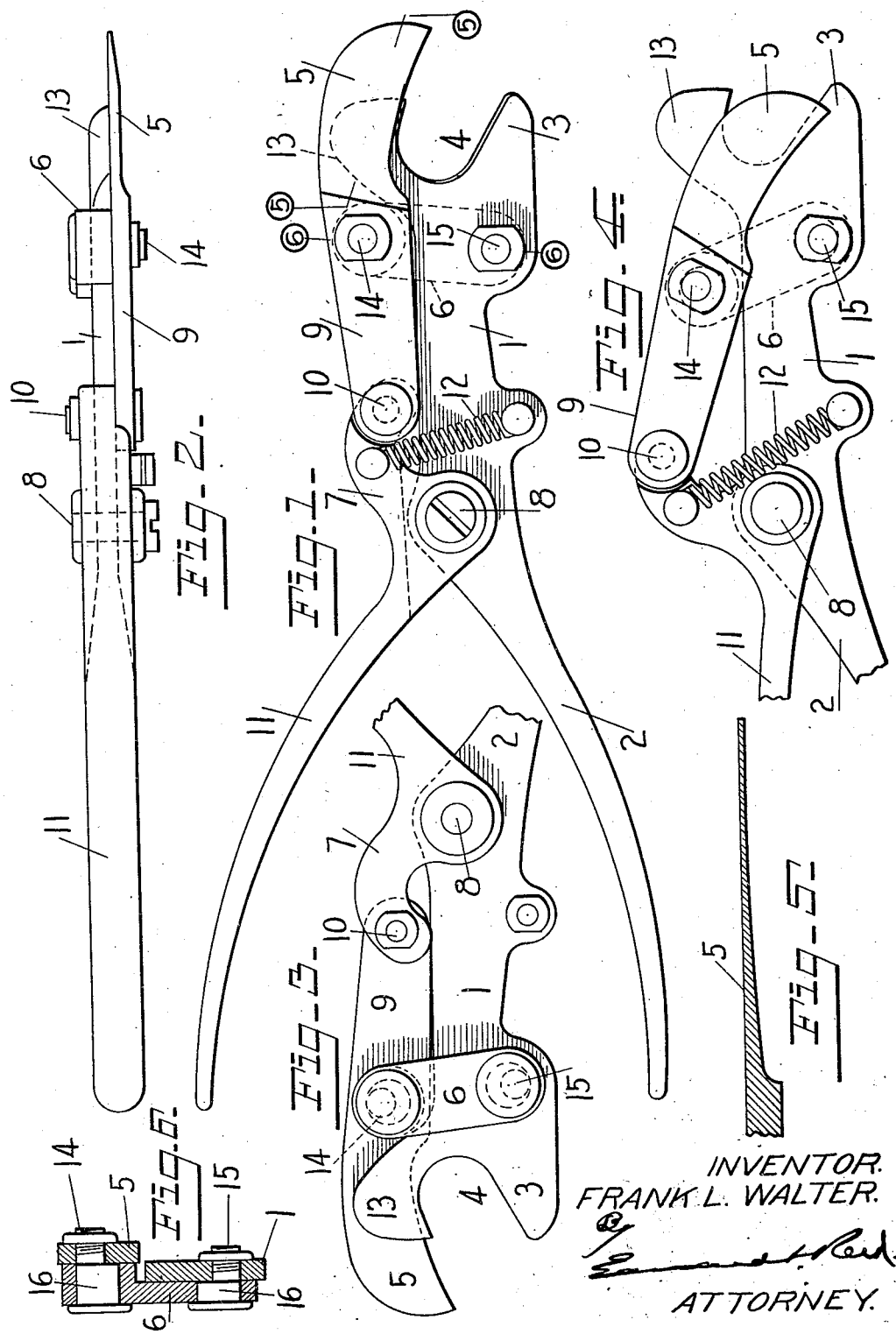

1,753,225

UNITED STATES PATENT OFFICE

FRANK L. WALTER, OF DAYTON, OHIO; MARGARET M. WALTER EXECUTRIX OF SAID FRANK L. WALTER, DECEASED

PRUNING SHEARS

Application filed February 26, 1925. Serial No. 11,709.

This invention relates to pruning shears and the like.

One object of the invention is to provide pruning shears which will sever a branch of a tree or the like with a clean smooth cut without crushing the branch.

A further object of the invention is to provide shears in which a blade will have both transverse and longitudinal movement relative to the cooperating cutting member and will thus engage the branch with a draw cut.

A further object of the invention is to provide pruning shears of this character in which the blade may be adjusted with relation to the cooperating cutting member.

A further object of the invention is to provide pruning shears which will be simple in construction, easy to operate and of a strong durable character.

Other objects of the invention will appear as the device is described in detail.

In the accompanying drawings Fig. 1 is a side elevation of pruning shears embodying my invention; Fig. 2 is a top plan view of the same; Fig. 3 is a side elevation of the shears from the side opposite that shown in Fig. 1, with the handles broken away; Fig. 4 is a side elevation of the shears showing the blade in its closed or operative position; Fig. 5 is a section of the blade taken on the line 5—5 of Fig. 1; and Fig. 6 is a section taken on the line 6—6 of Fig. 1.

In these drawings I have illustrated one embodiment of my invention and have shown the same as comprising a member or body portion 1 having at its rear end suitable supporting means, such as a part 2 forming a handle, and having at its forward end a second part 3, the edge of which constitutes a work support and is adapted to engage and support the branch which is being cut during the cutting operation. This work supporting part may be connected with the body portion or member, in any suitable manner but is preferably rigidly connected thereto and is here shown as formed integral therewith. In the present construction the forward end of the body portion 1 is of increased width and is provided with a recess 4 adapted to receive the branch or other part to be cut, the lower wall of this recess being formed by the work supporting edge of the part 3. The edge of the part 3 may, if desired, be provided with more or less of a cutting edge but, in the present instance, it is merely beveled slightly without being sharpened and therefore does not form a cutting edge. Mounted on the body portion 1 is a blade 5, the cutting edge of which is opposed to the work support or cooperating cutting member 3. This blade is so mounted on the member 1 that it may move both longitudinally and transversely with relation to the work support, whereby it will be caused to engage the work on said support with a draw cut, thus causing it to sever the branch with a clean smooth cut and facilitating the operation of the blade. In the present device, this movement of the blade is secured by mounting the same on the body portion or member 1 by means of a link 6 which is pivotally connected at its respective ends with the blade and with the body portion. Suitable means are provided for simultaneously imparting both transverse and longitudinal movement to the blade and, in the present instance, an actuating arm 7 is pivotally mounted on the body portion or member 1, at 8, extends upwardly and forwardly from its axis and has its outer end pivotally connected with the blade, which is preferably provided with a portion 9 extending rearwardly from its point of connection with the link, with which portion the arm 7 is connected by a pivot 10. Connected with the arm 7 is a suitable actuating device which, in the present instance, is in the form of a handle 11 arranged to cooperate with the handle 2. This handle is also mounted on the member 1 by means of the pivot 8 and is, in the present instance, formed integral with the actuating arm 7. It will be apparent that the movement of the actuating arm 7 about its axis will move the link 6 about its point of pivotal connection with the body portion or member 1 and will also rock the blade about its point of pivotal connection with the link. In this manner the blade as a whole is moved rearwardly and at the same time, due to the movement of the link about its axis and the movement of the blade about its point of connection with the link, it is moved transversely to the work support. A spring 12 connected at one end with the arm 7 and at the other end with the body portion 1 serves to hold the blade normally in its retracted or inoperative position. In the present construction the upper part of the enlarged end of the body portion 1, as shown at 13, overlaps the blade in all positions thereof and serves to guide the same in its movement toward and from the work support or cooperating cutting member.

The thickness of the cutting portion of the blade 5 is preferably decreased toward the outer end of the blade, as shown in Fig. 5, the blade being preferably ground to substantially a spiral shape. Due to this shape of the blade it will be apparent that when the blade is operated the longitudinal movement thereof will serve to draw a thinner portion of the blade into the kerf as the cutting operation progresses, thereby preventing the blade from binding and rendering the operation of the device easy.

I have also provided means whereby the blade may be adjusted with relation to the work support, to compensate for the decreased width of the blade due to grinding. In the present device this is accomplished by connecting the link 6 with the blade and the body portion 1 by means of eccentric pivots 14 and 15. These pivots, as shown in Fig. 6, comprise body portions 16 which are rotatably mounted in one of the members to be connected, in the present device in the link 6, and are provided with eccentrically arranged studs which extend respectively through the blade 5 and the body portion 1. By rotating these eccentric pivots about their axes the effective distance between the axes of the two pivots may be varied and the blade thereby adjusted with relation to the work support.

The operation of the device will be readily understood from the foregoing description and it will be apparent that I have provided pruning shears of a very simple construction, which are very easy to operate and which are of a very strong durable character; that the blade will act on the branch, or other part to be cut, without binding and with a draw cut, thereby not only severing the same with a smooth clean cut but rendering the operation of the device very easy. By varying the effective length of the link the blade can be adjusted with relation to the work support and thereby maintained in operative relation thereto until it has been ground away to such an extent as to destroy its strength.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. Shears of the character described comprising a member having a part forming a work support, a blade to cooperate with said work support, a link to connect said blade with said member, eccentric pivot pins for connecting said link with said blade and said member, said pivot pins being adjustable to adjust said blade with relation to said work support, and means for actuating said blade.

2. Pruning shears comprising a rigid elongated member having at one end a part forming a handle and having at its other end a work receiving recess the lower edge of which extends at an acute angle to the length of said member to form a work support, a link pivotally mounted on said member to the rear of said recess, a blade pivotally mounted on and supported by said link and having a cutting edge arranged approximately parallel with the work supporting edge of said recess, a handle pivotally mounted on said member and having pivotal connection with said blade to move the same both transversely and longitudinally with relation to the work supporting edge of said recess, and a spring acting on said blade to move the same toward said work supporting edge of said recess.

3. Pruning shears comprising a rigid elongated member having a part forming a handle and having at that end thereof opposite said handle a part provided with a work supporting edge, a blade extending lengthwise of the last mentioned part of said member and having a cutting edge extending approximately parallel with said work supporting edge, a link pivotally mounted at one end on said member in the rear of said work supporting edge and having its other end extending beyond that edge of said member adjacent to said blade and pivotally connected with said blade between said cutting edge and the rear end of said blade, and a second handle pivotally mounted on said member and having a part extending forwardly from its axis and pivotally connected with said blade in the rear of said link, said second handle and said link constituting the whole of the connection between said blade and said member and cooperating to cause the cutting edge of said blade to move both transversely and longitudinally with relation to the work supporting edge of said member.

In testimony whereof, I affix my signature hereto.

FRANK L. WALTER.